US009200729B2

(12) United States Patent
Hobbs (10) Patent No.: US 9,200,729 B2
(45) Date of Patent: Dec. 1, 2015

(54) COMBINATION HANGER AND REINFORCEMENT BRACKET

(71) Applicant: Paul E. Hobbs, Harpers Ferry, WV (US)

(72) Inventor: Paul E. Hobbs, Harpers Ferry, WV (US)

( * ) Notice: Subject to any disclaimer, the term of this patent is extended or adjusted under 35 U.S.C. 154(b) by 12 days.

(21) Appl. No.: 14/285,776

(22) Filed: May 23, 2014

(65) Prior Publication Data

US 2014/0345735 A1 Nov. 27, 2014

Related U.S. Application Data

(60) Provisional application No. 61/827,336, filed on May 24, 2013.

(51) Int. Cl.
*F16L 3/00* (2006.01)
*F16L 59/135* (2006.01)

(52) U.S. Cl.
CPC .............. *F16L 3/006* (2013.01); *F16L 59/135* (2013.01)

(58) Field of Classification Search
CPC ....... F24F 13/0254; F24F 13/32; F16L 3/006; F16L 3/14; F16L 55/035; F16F 1/3732; F16B 5/0241
USPC ............. 138/106, 107; 248/65, 58, 59, 220.1; 403/205
See application file for complete search history.

(56) References Cited

U.S. PATENT DOCUMENTS

| | | |
|---|---|---|
| 2,123,410 A | 7/1938 | Fawcett |
| 2,302,550 A | 11/1942 | Hoyle |
| 2,302,565 A | 11/1942 | Milhone |
| 2,491,700 A | 12/1949 | Zwerling |
| 2,889,145 A | 6/1959 | Hoffman |
| 3,219,337 A | 11/1965 | Hagen, Jr. |
| 3,387,809 A | 6/1968 | Zwerling |
| 3,462,104 A | 8/1969 | Muller et al. |
| 3,563,278 A | 2/1971 | Schardein et al. |
| 3,687,168 A | 8/1972 | Sherman et al. |
| 3,863,877 A * | 2/1975 | Gregory .................... 248/295.11 |
| 3,960,350 A | 6/1976 | Tardoskegyl |
| 4,036,460 A | 7/1977 | Storck et al. |
| 4,077,592 A | 3/1978 | Forbes |
| 4,102,587 A | 7/1978 | Herb et al. |
| D256,216 S | 8/1980 | Van Horn et al. |
| 4,305,557 A | 12/1981 | Kowalski |

(Continued)

FOREIGN PATENT DOCUMENTS

| | | |
|---|---|---|
| DE | 20102258 | 11/2001 |
| JP | H04186050 | 7/1992 |

(Continued)

*Primary Examiner* — Patrick F Brinson
(74) *Attorney, Agent, or Firm* — Leveque Intellectual Property Law, P.C.

(57) ABSTRACT

A hanger bracket for supporting duct having an extended plate portion configured to support a surface of a duct and configured to accommodate coupling of the hanger bracket to the bottom surface of the duct; a vertical back plate portion attached to the extended plate portion and configured to couple the hanger bracket to a side surface of the duct; a top plate portion attached to the vertical back plate portion and in parallel arrangement with the extended plate portion and configured to accommodate a hanger element passed at a side of the duct above the bottom surface of the duct in an offset hanger attachment; and at least one gusset portions attached to a back side of the vertical back plate portion and an underside of the top plate portion to provide structural support to the top plate portion.

31 Claims, 11 Drawing Sheets

(56) References Cited

U.S. PATENT DOCUMENTS

| | | | | |
|---|---|---|---|---|
| 4,305,677 | A | 12/1981 | Kowalski | |
| 4,650,085 | A * | 3/1987 | Davies et al. | 220/4.02 |
| 4,706,922 | A | 11/1987 | Grow | |
| 4,895,331 | A | 1/1990 | Nehls | |
| 4,958,792 | A | 9/1990 | Rinderer | |
| 5,096,155 | A * | 3/1992 | Fitzgerald | 249/219.1 |
| 5,100,086 | A | 3/1992 | Rinderer | |
| 5,350,141 | A | 9/1994 | Perrault et al. | |
| 5,352,000 | A | 10/1994 | Issagholian-Haval et al. | |
| 5,580,014 | A | 12/1996 | Rinderer | |
| 5,653,412 | A | 8/1997 | Martorano et al. | |
| D405,348 | S | 2/1999 | Orr | |
| 6,076,788 | A | 6/2000 | Akiyama | |
| D430,479 | S | 9/2000 | McDonald | |
| D432,901 | S | 10/2000 | McDonald | |
| 6,202,969 | B1 | 3/2001 | Orr | |
| 6,457,692 | B1 | 10/2002 | Gohl, Jr. | |
| 6,463,961 | B1 * | 10/2002 | Iizuka | 138/107 |
| 6,612,529 | B2 | 9/2003 | Snyder | |
| 6,932,334 | B1 | 8/2005 | Gregory | |
| 6,957,670 | B1 | 10/2005 | Kajino | |
| 7,030,822 | B1 * | 4/2006 | Grabowski | 343/715 |
| 7,165,915 | B2 * | 1/2007 | Queen | 405/244 |
| D550,831 | S | 9/2007 | Rausch | |
| 7,320,453 | B2 | 1/2008 | Berlyn et al. | |
| 7,470,859 | B1 * | 12/2008 | Gretz | 174/72 A |
| 7,501,576 | B2 | 3/2009 | Gagliardi | |
| 7,575,213 | B2 | 8/2009 | Rausch | |
| 7,744,134 | B2 | 6/2010 | Dingley | |
| 7,818,943 | B2 * | 10/2010 | Dziwak | 52/745.15 |
| 8,151,535 | B1 * | 4/2012 | Thompson | 52/715 |
| 8,235,331 | B2 | 8/2012 | McIntosh | |
| 2002/0113184 | A1 | 8/2002 | Snyder | |
| 2003/0034424 | A1 | 2/2003 | Collins | |
| 2005/0189462 | A1 | 9/2005 | Berlyn et al. | |
| 2005/0218277 | A1 * | 10/2005 | Shaw et al. | 248/201 |
| 2005/0229525 | A1 | 10/2005 | Berlyn | |
| 2007/0075198 | A1 | 4/2007 | Foser | |
| 2007/0075213 | A1 | 4/2007 | Foser et al. | |
| 2007/0145222 | A1 | 6/2007 | Rausch | |
| 2007/0204752 | A1 | 9/2007 | Hord et al. | |
| 2009/0224538 | A1 | 9/2009 | Fischer | |
| 2010/0187817 | A1 | 7/2010 | Martin | |
| 2011/0113719 | A1 | 5/2011 | Harris | |
| 2011/0155275 | A1 | 6/2011 | Wallin et al. | |
| 2011/0156387 | A1 | 6/2011 | Hasegawa et al. | |
| 2011/0174007 | A1 | 7/2011 | Kumar | |
| 2011/0274886 | A1 | 10/2011 | Flennert | |
| 2012/0047827 | A1 | 3/2012 | Zeilenga et al. | |
| 2012/0097287 | A1 | 4/2012 | Shimizu et al. | |
| 2012/0180288 | A1 | 7/2012 | Crowley | |
| 2012/0248768 | A1 | 10/2012 | Fischer | |
| 2012/0266995 | A1 | 10/2012 | Carson | |
| 2015/0136929 | A1 * | 5/2015 | Curtis | 248/309.1 |

FOREIGN PATENT DOCUMENTS

| | | |
|---|---|---|
| JP | H09210253 | 8/1997 |
| JP | 2004036992 | 2/2004 |
| JP | 2007147185 | 6/2007 |

* cited by examiner

COMBINATION HANGER AND REINFORCEMENT BRACKET

PRIORITY CLAIM

This application claims priority to U.S. Provisional Patent Application No. 61/827,336 filed May 24, 2013, which is hereby incorporated herein by reference.

TECHNICAL FIELD

The present disclosure relates to duct hanging, including sheet metal duct hanging, and more particularly to a combination duct hanger and reinforcement apparatus and assembly.

BACKGROUND

In commercial and industrial construction, installing or hanging duct systems is accomplished by installing all-thread rod from the structure and using steel supporting members as trapeze hangers. The size and length of the trapeze hanger is determined by the size and weight of the duct. Additionally, these trapeze hangers are subject to steel reinforcement requirements, such as those of SMACNA (Sheet Metal and Air Conditioning Contractors National Association, Inc.). Steel reinforcement of sheet metal ducts provides structural integrity on the all sides of the duct so that it can withstand the air pressure inside the duct. The type of reinforcement needed is determined by the type of material and size of the duct, as well as anticipated pressure to which the duct will be subjected. Reference can be made to SMACNA manuals for more specific charts and description of duct reinforcement.

BRIEF DESCRIPTION OF THE DRAWINGS

Example embodiments of the present disclosure will be described below with reference to the included drawings such that like reference numerals refer to like elements and in which.

DETAILED DESCRIPTION

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. Reference throughout this document to "one embodiment", "certain embodiments", "an embodiment", "an example", "an implementation", "an example" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

A hanger bracket and hanger bracket assembly for supporting duct may be used in combination with duct pressure reinforcement systems. The bracket is formed of a piece of galvanized sheet steel or other suitable base material and can provide multiple ways of connection to both the duct and the hanger rod. The hanger bracket provides an offset hanger rod attachment on the side of the duct and not under the duct to save ceiling space below the duct. The hanger bracket may be directly attached to the duct with the use of screws, rivets, welding, non-mechanical fastening systems, or other suitable fastening elements. The hanger can be attached directly to a strut or similar steel support member to provide a trapeze support for the duct or may be incorporated into a duct pressure class reinforcement system.

In accordance with the various embodiments described herein there is provided a hanger bracket that can be used to efficiently and economically install ducts. The hanger bracket can eliminate the need to have trapeze hangers and duct pressure reinforcement side-by-side. The hanger bracket can incorporate together duct pressure reinforcement and ductwork hanging, which will decrease material cost and reduce shop fabrication labor and installation site labor. The embodiments described herein will also reduce the loose material needed at the installation site, thereby also reducing installation labor, material handling cost and jobsite material storage requirements. The bracket can be directly attached to the duct, either in the fabrication shop or at the installation site; this can eliminate the need to install long trapeze assemblies and provides both material and labor savings. Such direct attachment of the hanger bracket to the duct can be accomplished using screws, rivets, welding, non-mechanical fastening systems, or other fastening elements. Alternately, the hanger bracket can be attached directly to a strut or similar steel support member to provide a trapeze supporting method or it can be incorporated into duct pressure class reinforcement system.

A hanger bracket of the various embodiments herein is useful for supporting ducts and may be used in combination with duct pressure reinforcement systems. The hanger may be formed of galvanized sheet steel (other base materials may also be used) and provides multiple ways of connection to both the duct being supported and the hanger rod. The hanger provides an offset hanger rod attachment on the side of the duct and not under the duct to save ceiling space below the duct. The hanger may be directly attached to the duct with the use of screws, rivets, welding or other non-mechanical fastening system. The hanger can be attached directly to a strut or similar steel support member to provide a trapeze supporting method or it can be incorporated into duct pressure class reinforcement system.

Duct pressure class reinforcement is required when the air pressure/vacuum inside the duct is expected to cause the sides of the duct to distort, which may cause permanent damage to the duct. In these cases, industry standards such as those put forth by SMACNA (Sheet Metal and Air Conditioning Contractors National Association, Inc.) sets a minimum standard of the type of reinforcement that is required in the duct construction depending on the type of material, size and anticipated pressure. When this external duct reinforcement is required, the reinforcement is usually installed in a fabrication shop where the duct is constructed and the hanger is added independently at the installation site using separate materials. The present hanger described herein provides a combination hanger and reinforcement bracket that will save time and money by utilizing the same material for the reinforcement as for the hanger. Moreover, if the duct size requires a trapeze hanger supporting method, the duct would typically be fabricated with all of the reinforcement requirements by SMACNA before it is delivered to the installation site and then the installers at the site would install additional supporting steel members to suspend the duct in the air. This has been a waste of material and labor; hanger bracket described herein will allow the installer to use the same support members used in the duct reinforcement to also be used for hanging the duct at the site.

The hanger bracket is preferably fabricated of carbon steel, and most preferably medium carbon steel, such as SAE (Society of Automotive Engineers) "Standard steel," designated as standard type "1040." Any suitable steels, alloys or composite materials are considered for fabrication of the present disclosure. Plastics, Polyester, Vinyl ester resin, epoxy resin and carbon fiber are examples of other possible base material that may be used for the hanger bracket. These non-metallic materials are most commonly used in laboratories or facilities where sensitive electronic, magnetic equipment or highly corrosive material is used. Factors that should be considered in the selection of hanger bracket material should be strength, hardness, weight, cost, manufacturing requirements and environmental conditions. The bracket must have the ability to withstand corrosion or deterioration when installed in harsh environments and still perform to the design criteria for that material. Preferably, and most commonly the steel hanger bracket is "hot-dipped" in a zinc galvanizing solution, to protect it from cold and moist atmospheres. The steel preferably has a thickness of 0.135 or 10 gauge, although the bracket can be made of lighter material for light duty applications or thicker for heavy duty applications. The width of the bracket is preferably 1⅝" wide to fit uniformly with common strut systems or it can be made wider or narrower depending on the installation requirements. The height of the bracket is preferably four inches tall to allow the use of strut on both sides of the duct and leave adequate room to install the nut and washer on the hanger rod.

Consider the following test information and data in which six steel hanger brackets each of 10 gauge (GA), 12 GA, and 14 GA were subjected to tension tests. As described in a test report dated Jan. 2, 2014:

"Product Description: The steel HVAC hanger bracket is formed from A653 galvanized steel plate (10 GA, 12 GA, and 14 GA). The "L" shaped bracket is 3½ in long by 1⅝ in wide with two 3/16 in diameter holes spaced 1 15/16 inches apart and one 13/32 in diameter hole that is located 1 inch from the end, with all holes centered in the X direction. The upper portion of the bracket is 2½ in long by 2 in wide by 4¼ in high with two 7/16 in diameter holes spaced 1 in apart; with the first hole being located ½ in from the end and both holes centered in the X-direction."

A total of six test specimens were evaluated for each of three steel brackets provided. "Each specimen was rigidly attached to the base of the test frame of the Instron, Model 3369 Universal Testing Machine (ATI Assert #005740). The upper portion of the steel hanger bracket was then attached to the test machine's crosshead with a swivel mechanism and ⅜-16 rod with washers and nuts. Load was applied at a rate of 0.10 in/min for the 10 GA steel hanger bracket; 0.08 in/min for the 12 GA steel hanger bracket; 0.06 in/min for the 14 GA steel hanger bracket. Deflection measurements were taken based on the crosshead of the test machine . . . ."

The test results are summarized in the following tables. It can be seen that the strength exhibited by the hanger bracket disclosed herein exceeds SMACNA requirements.

TABLE 1

10 GA Steel Hanger Bracket

| Specimen No. | Maximum Load ($lb_f$) |
|---|---|
| 1 | 4819 |
| 2 | 4208 |
| 3 | 4809 |
| 4 | 3591* |
| 5 | 3516* |
| 6 | 3517* |
| AVERAGE | 4077 |

*Testing stopped at 3500 $lb_f$

TABLE 2

12 GA Steel Hanger Bracket

| Specimen No. | Maximum Load ($lb_f$) |
|---|---|
| 1 | 3025 |
| 2 | 2505* |
| 3 | 2507* |
| 4 | 2508* |
| 5 | 2505* |
| 6 | 2508* |
| AVERAGE | 2593 |

*Testing stopped at 2500 $lb_f$

TABLE 3

14 GA Steel Hanger Bracket

| Specimen No. | Maximum Load ($lb_f$) |
|---|---|
| 1 | 2006 |
| 2 | 1504* |
| 3 | 1504* |
| 4 | 1505* |
| 5 | 1503* |
| 6 | 1504* |
| AVERAGE | 1588 |

*Testing stopped at 1500 $lb_f$

Therefore, in accordance with the above and in accordance with the various embodiments described herein there is provided a duct hanger bracket having: an extended plate portion configured to support a bottom surface of a duct, the extended plate portion having one or more extended plate holes configured to accommodate coupling of the hanger bracket to the bottom surface of the duct; a vertical back plate portion attached to the extended plate portion and configured to couple the hanger bracket to a side surface of the duct, the vertical back plate portion having one or more vertical back plate holes configured to accommodate coupling of the hanger bracket to the side surface of the duct; a top plate portion attached to the vertical back plate portion and in parallel arrangement with the extended plate portion and having one or more top plate holes configured to accommodate a hanger element passed therethrough at a side of the duct above the bottom surface of the duct in an offset hanger attachment; and at least one angled gusset portion attached to a back side of the vertical back plate portion and an underside of the top plate portion to provide structural support to the top plate portion, with the at least one angled gusset portion having a bottom region coupled to a respective bottom corner region of the back side of the vertical back plate portion, a top region coupled to the underside of the top plate portion at a respective side region of the top plate portion, a front surface coupled to a respective side of the back side of the vertical back plate portion, and an angled back surface formed between the bottom region and the top region where a first dimension of the bottom region of the angled gusset portion is less than a second dimension of the top region of the angled gusset portion. A hanger bracket assembly makes use of the hanger bracket to hang and reinforce ducts.

Figure 1:
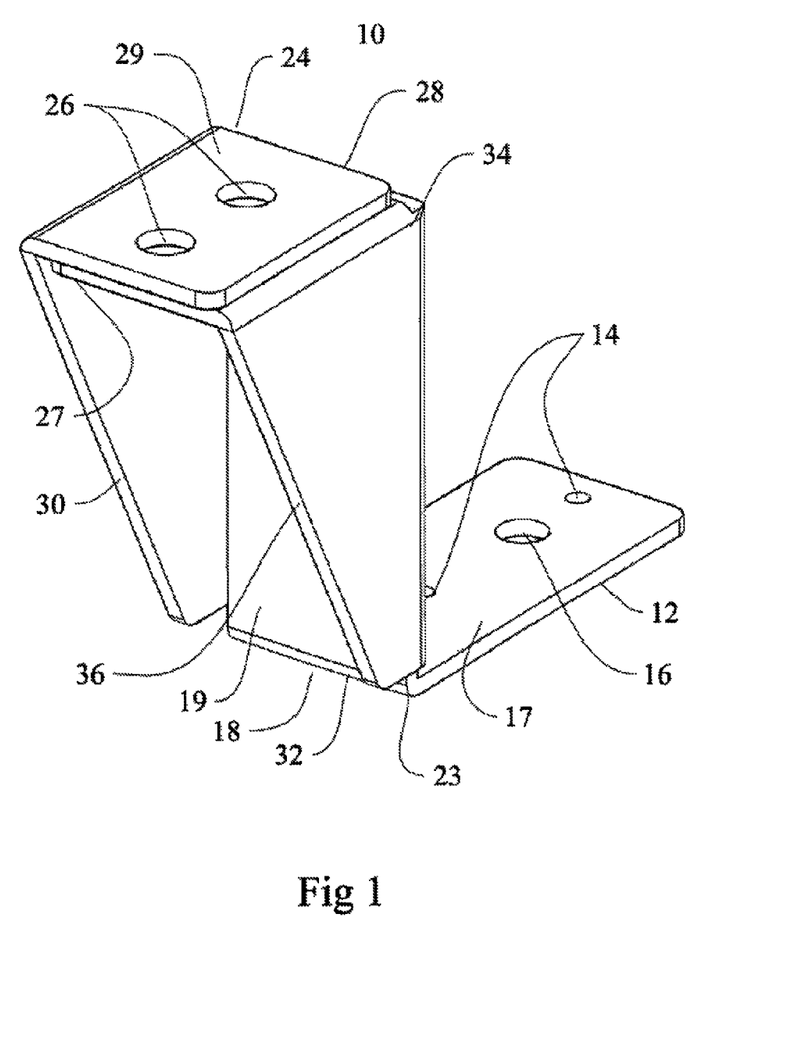
FIGS. 1-3 illustrate various an isometric views of a hanger bracket, consistent with certain embodiments.

Reference is now made to FIG. 1, in which an isometric view of hanger bracket 10 is shown. Hanger bracket 10 is formed of various portions, including extended plate portion 12, vertical back plate portion 18, top plate portion 24, and first and second angled gusset portions 30.

Extended plate portion 12 is configured to support a bottom surface of a duct, such as shown in FIGS. 4-9. Also, as shown in the all-thread rod reinforcement assembly 60 example of FIG. 6, the extended plate portion 12 can be used to support the top surface of a duct and a 1½ inch insulation board 64 is used. The extended plate portion 12 can have one or more extended plate holes that are configured to accommodate coupling of the hanger bracket to the bottom surface (or top surface) of the duct. These extended plate holes are illustrated as holes 14 and 16 in the drawings. Both types of holes can be used to couple the extended plate portion to the bottom surface of the duct when a fastening element, such as screw, rivet, welding, etc. is inserted through the extended plate hole of the extended plate portion. It can be seen by reference to FIGS. 1 and 2 that the arrangement and number of the holes, including smaller holes 14, can and may vary without departing from the spirit and scope of the invention.

Figure 9:
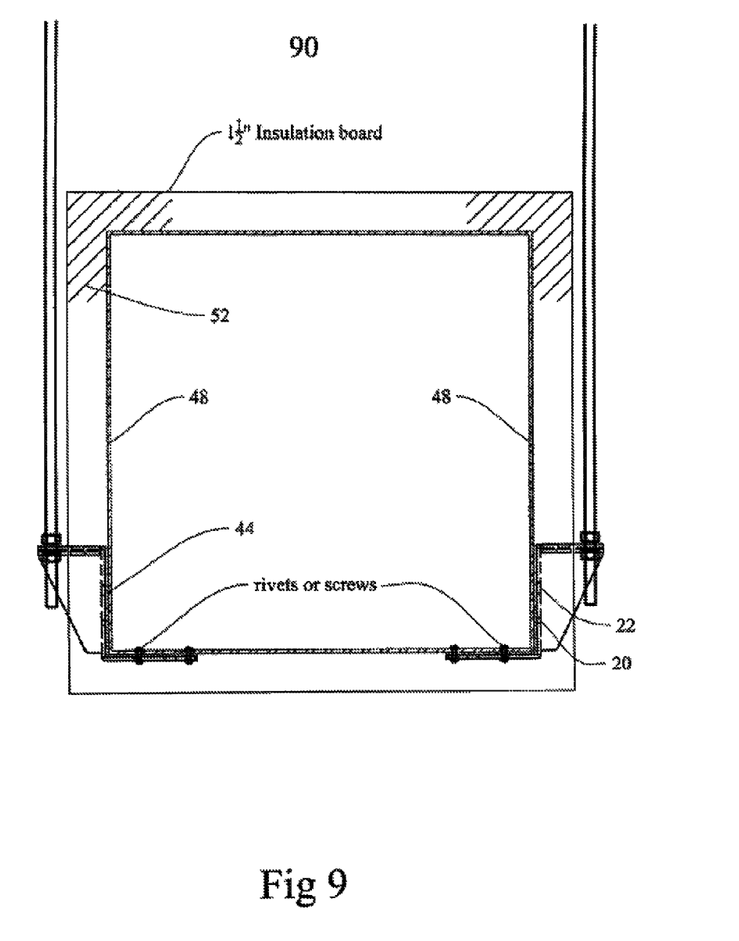

Extended plate holes 14 are configured to couple the extended plate portion to the bottom surface of the duct responsive to first and second fastening elements inserted through holes 14 and through corresponding first and second holes in the bottom surface of the duct, as shown in the direct coupling in the assembly of FIG. 9 where extended plate portion 12 is directly coupled to the bottom surface of the duct via an insulation tape, such as a foam insulation tape, interposed between a top surface of the extended plate portion and the bottom surface of the duct.

Alternately, extended plate hole 16 of extended plate portion 12 may be used to couple the extended plate portion to the bottom or top surface of the duct when a fastening element is inserted through the first extended plate hole of the extended plate portion. As illustrated in FIGS. 4-8, a fastening element can be inserted through larger extended plate hole 16 in a bottom surface of a support channel 42 upon which the duct 28 rests. A connection bolt 45 or other fastening element is used to fasten extended plate portion 12 to the steel support channel 42 as shown in the assembly 40 of FIG. 4, for example. A fastening element may likewise be inserted through extended plate hole 16 in a top surface of a support channel 62, in the all-thread rod reinforcement assembly 60 of FIG. 6.

If desired, foam isolation tape 44 may be interposed between the steel support channels 42, 62 and duct 48, as illustrated in FIGS. 4-9. The use of foam insulation tape 44 between the bracket and the duct provide thermal transmission separation and reduces thermal conductivity between the duct and bracket. This may be especially critical on very low temperature duct systems where sweating and moisture build-up is a concern. Tape 44 can also provide an alternate attachment means and expand the vibration or seismic capabilities of the hanger system.

From the foregoing, it can be understood that extended plate portion 12 is an extended plate that runs beneath the duct for support. In certain embodiments, extended plate portion 12 may be preferably 3 7/16" long, as this length provides adequate screw spacing when directly fastening to the duct and allows for bolt connections that are spaced to accommodate universal strut connections. The extended plate portion can lap under the duct corner and connect directly to the duct with screws, rivets or welding. A preferred 10 gauge material is wider and two times thicker than the heaviest strap specified in SMACNA HVAC Duct Construction Standards (Table 5-1 Rectangular Duct Hangers Minimum Size). Extended plate holes 14 may be small pre-punched holes in the extended plate portion for direct attachment to the duct with screw or rivets or other fastening elements. Welding or other non-mechanical fastening systems are also acceptable. Extended plate hole 16 may be a larger pre-punched hole in the extended plate portion to attach the bracket to a steel supporting member creating a trapeze or part of a duct pressure reinforcement system, such as the steel support channel 42, 62 discussed.

Figure 2:
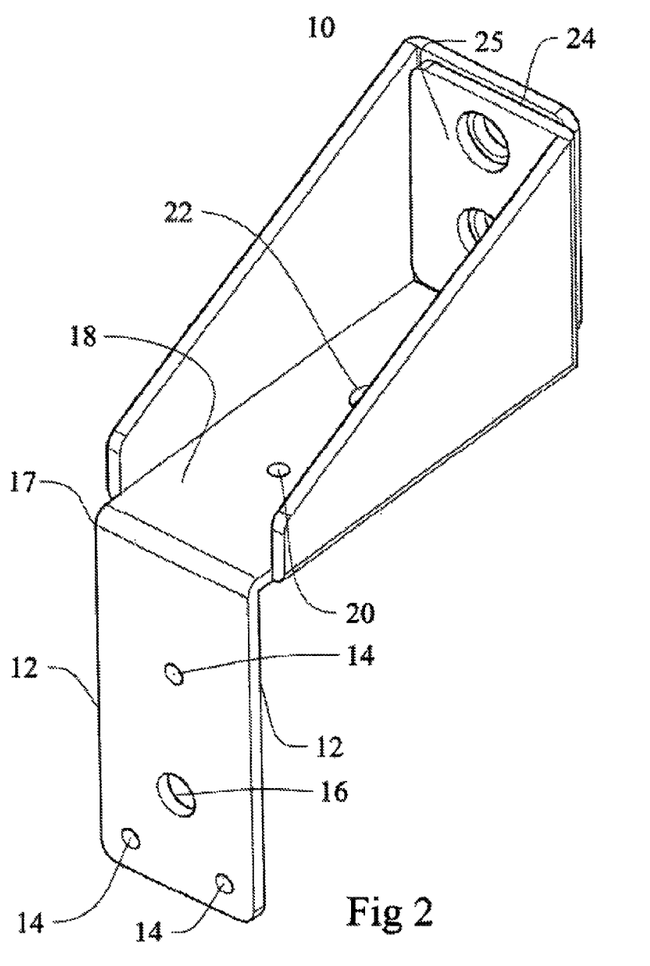

Vertical back plate portion 18 is attached to extended plate portion 12 and configured to couple the hanger bracket 10 to a side surface 49 of duct 48. As shown in FIG. 2, vertical back plate portion 18 may have one or more vertical back plate holes 20, 22 configured to accommodate coupling of the hanger bracket to the side surface 49 of the duct 48. As illustrated in the drawings, vertical back plate portion 18 is connected to an end 17 of the extended plate portion 12 and, as shown in the example embodiments, vertical back plate portion 18 is coupled to the extended plate portion at an approximately 90 degree angle.

Figure 6:
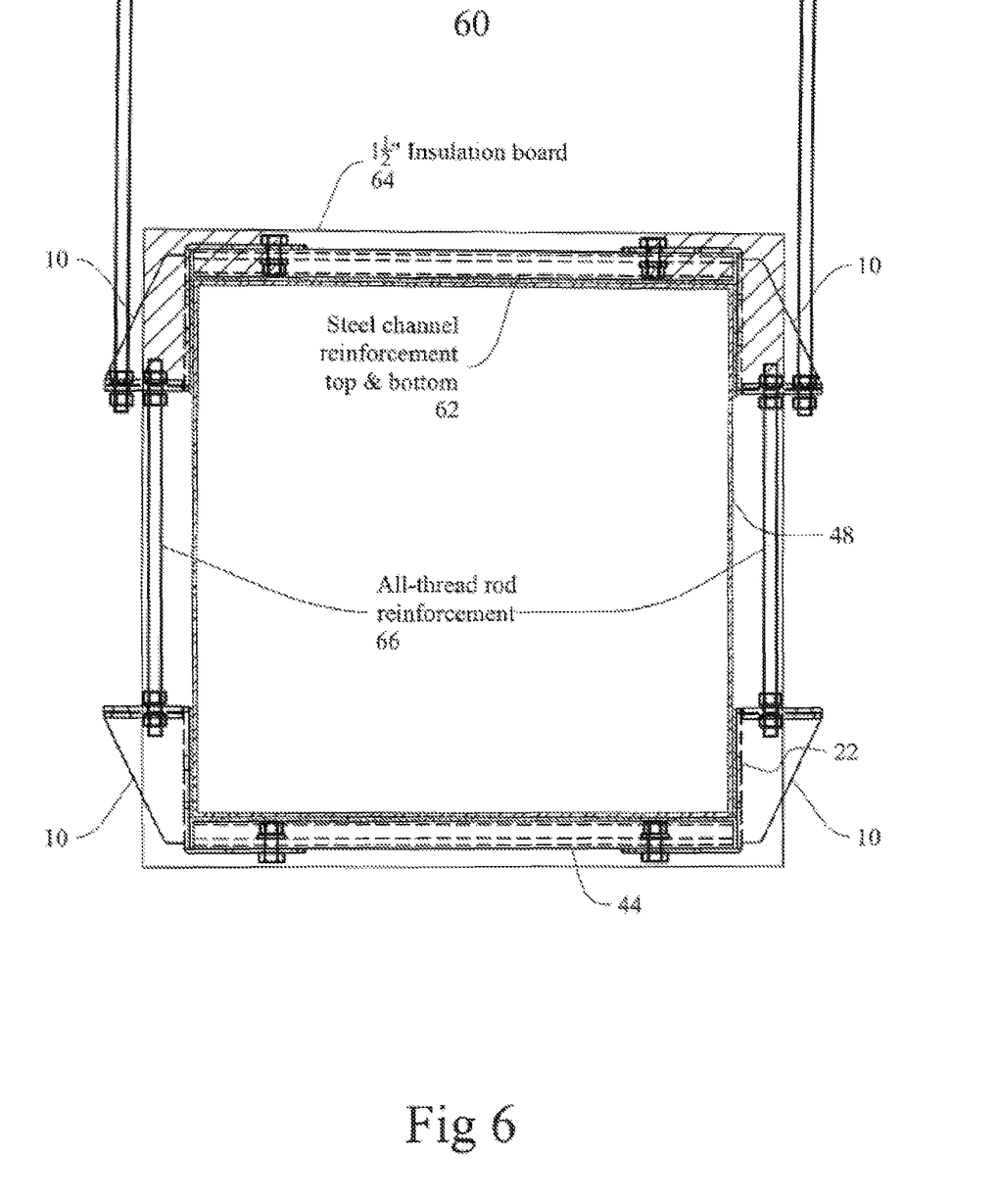
Figure 7:
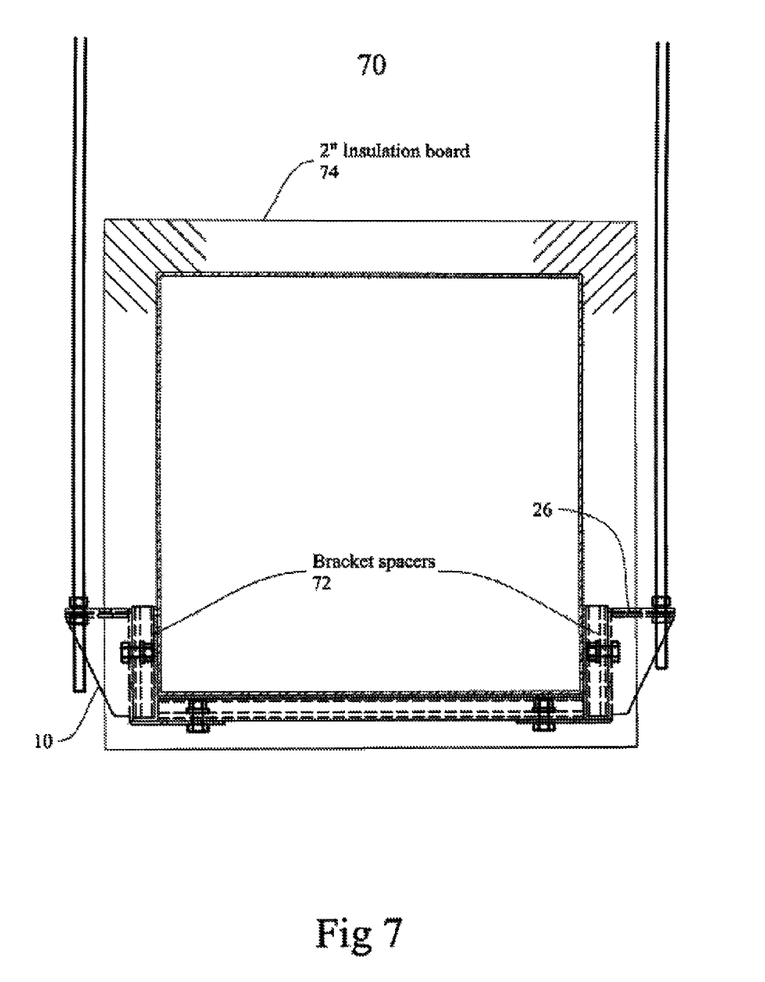

The vertical back plate holes 20, 22 may be of varying sizes, as shown here. Vertical back plate hole 22 provides for direct attachment of bracket hanger 10 to duct 48. Vertical back plate hole 20 allows for attachment of bracket hanger 10 to a reinforcement system, such as steel support channel 42, 62. Vertical back plate hole 20 also provides for attaching a spacer between the bracket 10 and duct 48 to extend the hanger bracket out away from the duct to accommodate thicker duct insulation, as illustrated in FIG. 7. Accordingly, larger vertical back plate hole 22 is configured to couple vertical back plate portion 18 to the side surface 49 of the duct 48 when a fastening element is inserted through vertical back plate hole 22 and a corresponding hole in the side surface of the duct, as shown in FIGS. 4-6 and 8-9. Smaller vertical back plate hole 20 of vertical back plate portion 18 is also configured to couple the vertical back plate portion to the duct, and may do so by insertion of a fastening element through hold 20 and into a corresponding hole in a bracket spacer 72 as shown in assembly 70 of FIG. 7. Spacer 72 moves the hanger away from the duct in order to accommodate thicker duct insulation, as in the 2 inch insulation board 74 shown in the drawing.

As shown in each of these figures, vertical back plate portion 18 may be directly coupled to the side surface 49 of duct 48 via an insulation tape 44 interposed between a front surface of the vertical back plate portion and the side surface of the duct.

Referring again to FIGS. 1-3, top plate portion 24 of hanger bracket 10 is attached to vertical back plate portion 18 and in parallel arrangement with the extended plate portion 12. Top plate portion 24 has one or more top plate holes 26 configured to accommodate a hanger element, such as an all-thread hanger rod or cable 46 passed therethrough at a side of the duct 48 above the bottom surface 47 of the duct in an offset hanger attachment. As discussed previously, the offset hanger rod attachment, in which the hanger element connects to the top plate portion on the side of the duct rather than under the duct, saves valuable ceiling space below the duct. In addition to saving ceiling space, this arrangement eliminates the need to cut-off the hanger rod after the duct is adjusted to its final location. This is quite different from the previous approach in which the hanger rod protrudes down below the duct support member and must be re-cut after the duct is installed because the protruding rod interferes with other above-ceiling installations or the ceiling itself. This may conflict with other trade installation or ceiling installation and may not be discovered until much later in the construction, and requires the duct installer to re-mobilize back to each hanger location to re-cut the rods. This can be a major labor cost in installing ductwork. The embodiments presented herein, conversely, will reduce, if not eliminate, this condition. The offset hanger rod attachment of the top plate portion 24 to hanger rod 46 on the side of the duct also reduces the length of hanger rod needed, which is a material cost savings.

There are two holes 26 shown in the example top plate portion 24 of the drawing. The outer hole is configured to accommodate an all-thread hanger rod passed through and coupled to top plate portion 24 by a fastening element, such as a bolt and screw. Use of the outer hole 26 for this purpose is shown in several of the drawings, including 4-9. The inner hole 26 may also be used as shown in FIG. 6 to accommodate a support member of a duct reinforcement element, such as all-thread rod 66. All-thread rods 66 pass through the outer top plate hole 26 and are in parallel arrangement with a side 49 of the duct. Please reference the SMACNA duct construction manuals for systems and methods of duct reinforcement. Thus, there are two holes in the top plate portion of the bracket, one to accommodate an all-thread hanger rod and the other to accommodate a side all-thread support member in duct reinforcement systems.

Top plate portion 24 has a thickness dimension that is greater than thickness dimensions of the extended plate, vertical back plate, and first and second angled gusset portions of the hanger bracket. Preferably, the top plate portion is formed when the two side gussets, shown as first and second angled gusset portions 30 are folded over to create two layers of metal giving the top plate portion 24 extra strength once the all-thread rod is inserted and the nuts are tightened to both sides of the top plate, as shown in the drawings. Thus, top plate portion in that example is formed of first and second layers of the first and second angled gusset portions and may have a thickness dimension that is approximately double that of either of the first and second angled gusset portions 30. Additionally, top plate portion 24 can be formed as one continuous, unitary form, welded or cast formed instead of folding.

First and second angled gusset portions 30, also referred to herein as gussets or gusset portions, are coupled to a back side 19 of vertical back plate portion 18 and an underside 28 of top plate portion 24 and provides structural support to top plate portion 24. Gussets 30 are angled from top to bottom such as gussets 30 preferably connect directly to the front edge 27 of the top plate 24 down to the bottom corners 23 of the vertical back plate 18.

Accordingly, an angled gusset portion 30 is characterized as having a bottom region 32 coupled to a respective bottom corner region 23 of the back side 19 of the vertical back plate portion 18, a top region 34 coupled to the underside 25 of the top plate portion 24 at a respective side region 28, 29 of top plate portion 24, a front surface coupled to a respective side of the back side 19 of the vertical back plate portion 18, and an angled back surface 36 formed between the bottom region 32 and the top region 34 where a first dimension, such as the depth, of the bottom region of the angled gusset portion is less than a corresponding second dimension, such as the depth, of the top region of the angled gusset portion. It can be seen in the drawings that each of the top regions 34 of the first and second gusset portions 30 has a dimension, such as depth, that approximates the depth dimension of the respective side region 28, 29 of the top plate portion to which it is coupled. These dimensions of the respective side regions 28, 29 of the gussets may be approximately the same, as in the drawings. Further the first and second angled gusset portions 30 are in a perpendicular arrangement with respect to the back side 19 of vertical back plate portion 18 and are parallel to each other in the arrangement shown in the example in the drawing. Of course, the first and second angled gusset portions 30 can be modified depending on material type and thickness and anticipated loads.

While two angled gusset portions 30 are shown and described, variations are contemplated in which one or more than two angled gusset portions 30 may be used. In the example embodiment of one angled gusset portion 30, the angled gusset portion 30 may be formed along a midline or other location along the length of the back side 19 of vertical back plate 18. Alternately, two or more angled gusset portions 30 may be arranged along the backside 19 of vertical back plate 18.

Figure 5:
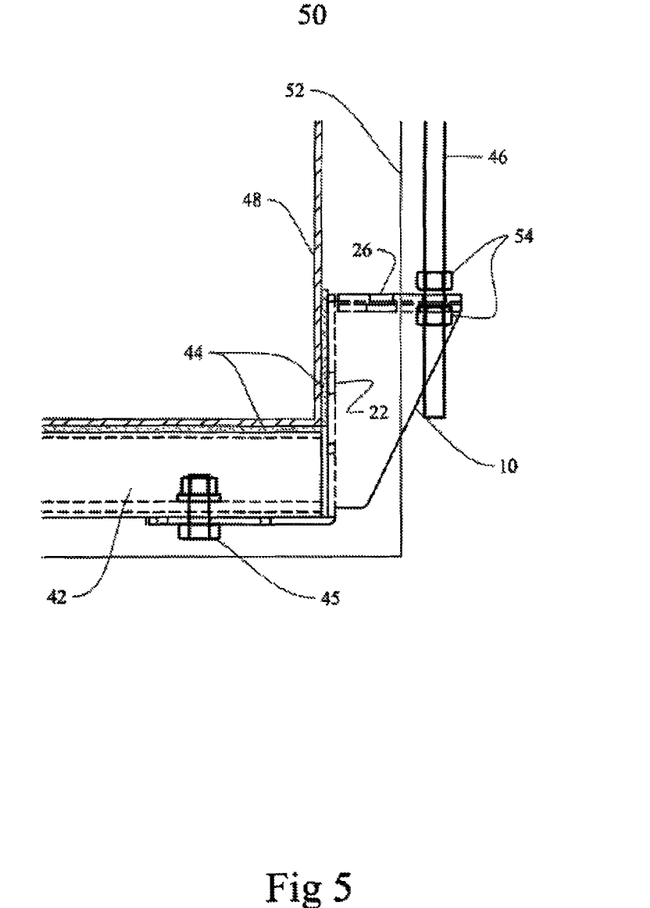

The size and shape of the bracket allows external duct insulation, such as duct external insulation 52 in assembly 50 of FIG. 5, to be installed without the hanger rod 46 penetrating the insulation. This allows the installer to adjust the duct height after the insulation is installed. This is important in installations where the duct's final location is tight against the structure or another obstacle. In these cases, the duct is hung, pressure tested if required, insulated and then adjusted to its final location. Most ceiling spaces are very congested and this type of installation requirement is common. As shown in the drawing, nuts and washers 54 on either side of top plate portion 24 is used to secure all-thread rod 46.

Figure 3:
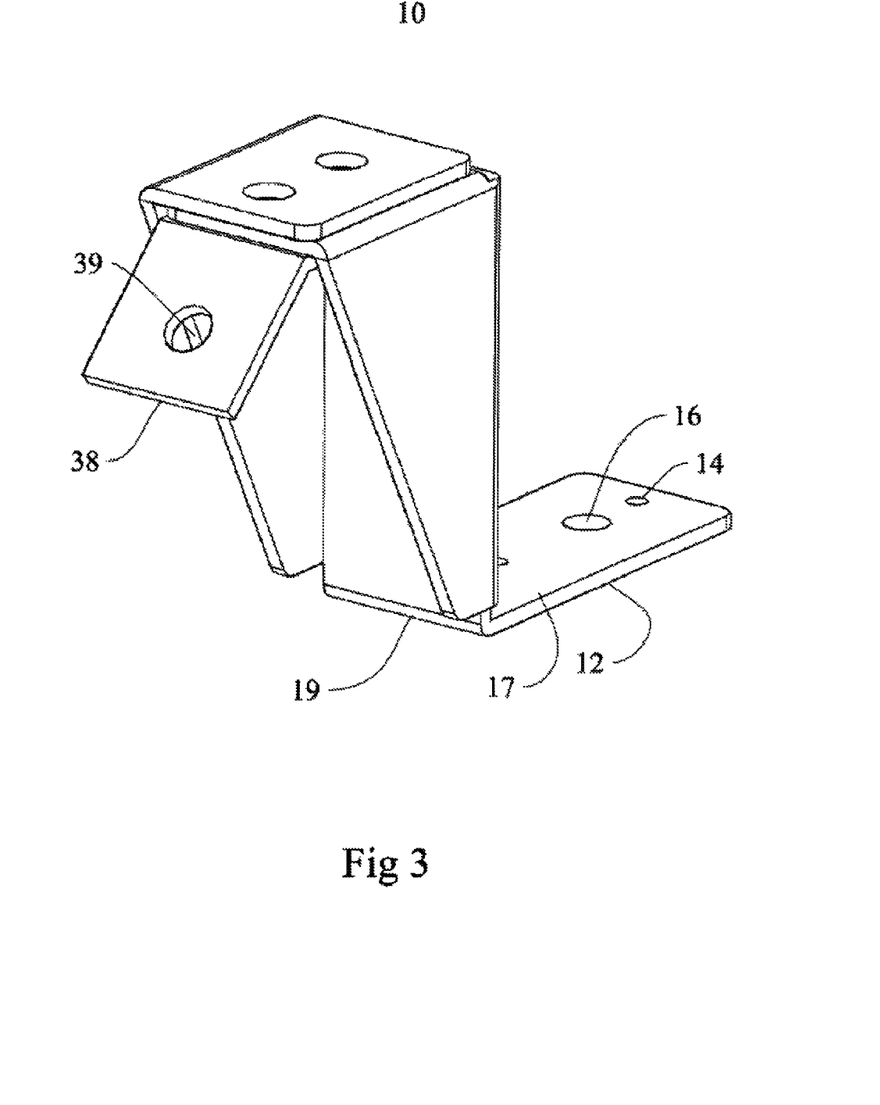
Figure 4:
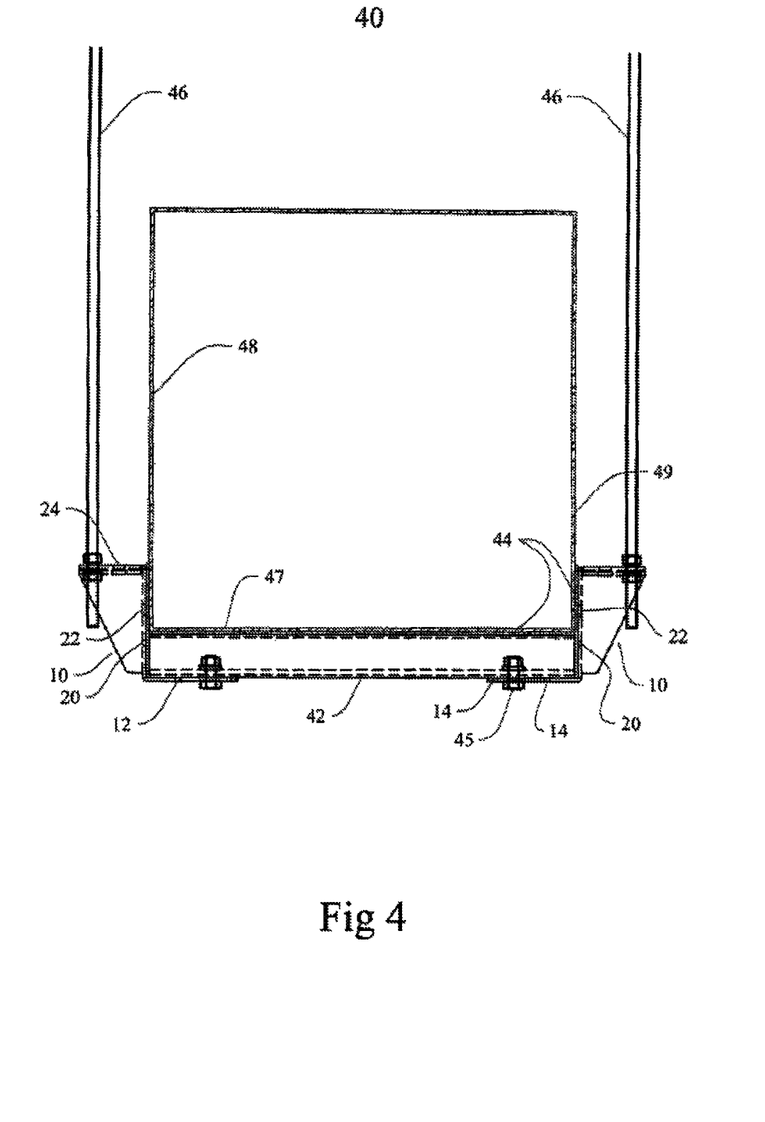
FIGS. 4-9 illustrate various hanger bracket assemblies, consistent with various embodiments presented herein.
Figure 8:
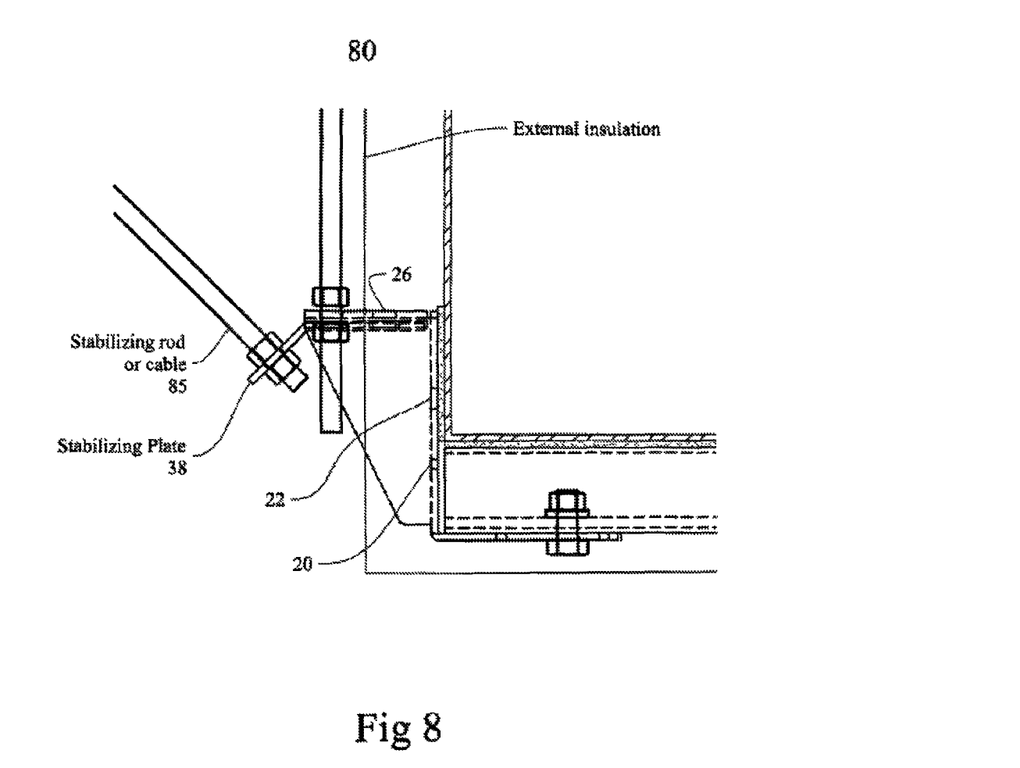

The hanger bracket may optionally have a stabilizing plate 38, as shown in FIGS. 3 and 8, added to the front of the bracket to allow for a movement stabilizing all-thread hanger rod or cable 82 for vibration or seismic restraints, as shown in assembly 80 of FIG. 8. Stabilizing plate 38 is coupled to the top plate portion 24 and angled with respect to the top plate portion 24. Stabilizing plate 38 has one or more stabilizing plate holes 39 configured to accommodate a stabilizing hanger element such as stabilizing all-thread rod or cable 82 passed therethrough at a side of the duct 48. The angle of the stabilizing plate with respect to vertical is less than 90 degrees. As illustrated in the example of FIGS. 3 and 8, the angle may be approximately 45 degrees and may be varied as needed to accommodate a particular installation.

Figure 10:
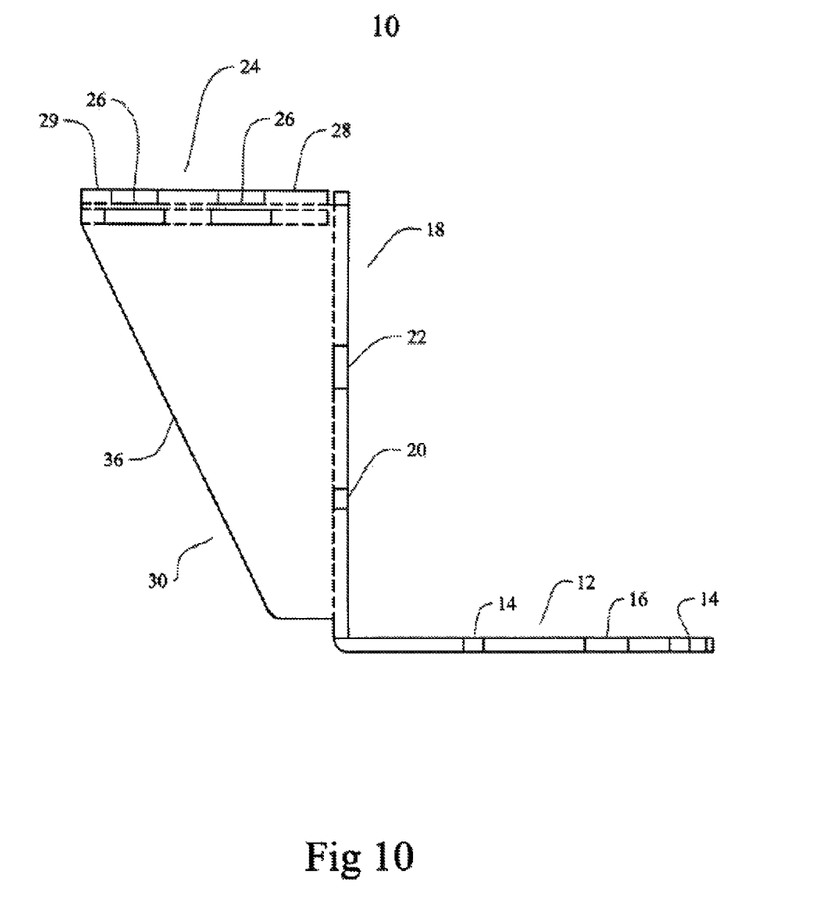
FIGS. 10 and 11 illustrate side and top views, respectively, of a hanger bracket, consistent with various embodiments presented herein.
Figure 11:
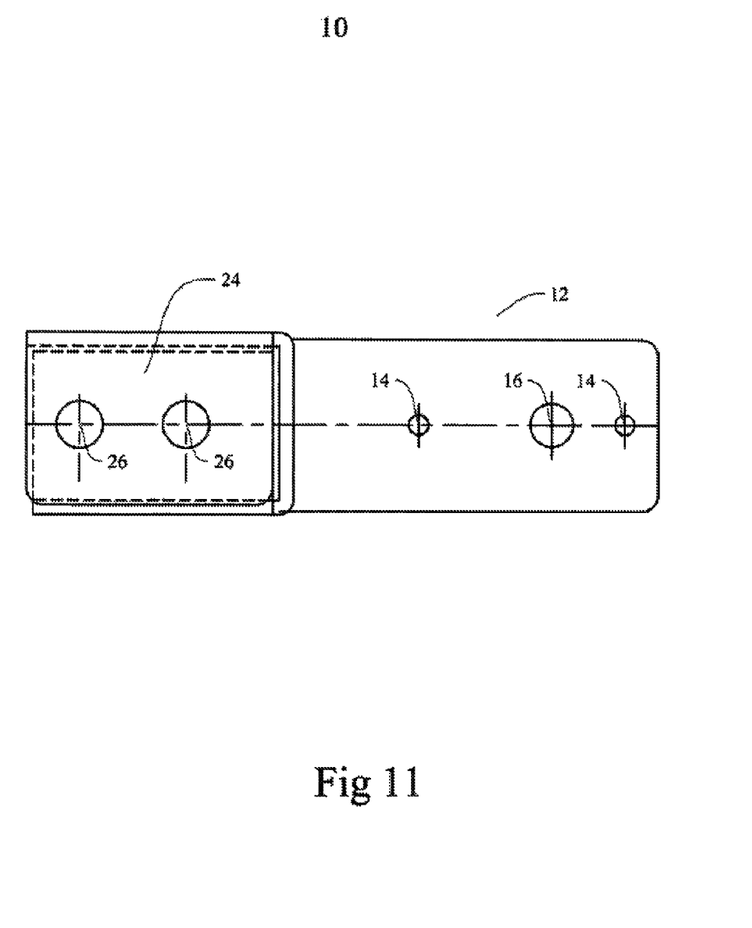

FIGS. 10 and 11 provide side and top views, respectively, of an example hanger bracket in accordance with various embodiments presented and discussed herein.

From the foregoing embodiments, it can be seen that there are several advantages to the hanger bracket discussed herein. In most commercial/industrial duct installations, the use of all-thread rod and trapeze hanger is used to hang duct. The additional all-thread sticking down below the duct interferes with other above ceiling material or the ceiling installation itself. The hanger bracket of the various embodiments presented herein, however, provides an option to the installer to directly attach the bracket to the duct and eliminate the steel support needed to make the trapeze. The bracket's all-thread rod connection is an offset hanger rod attachment on the side of the duct and not below the duct as in typical installations, which eliminates the need to cut off the rod after installation. Keeping the all-thread rod beside the duct eliminates the labor cost to cut the all-thread off after installation; it saves ceiling space and shortens the length of all-thread rod required for a job, saving material cost.

Moreover, the hanger bracket of the instant disclosure provides a way to directly connect the hanger to the duct. This type of connection allows duct to be hung with all-thread rod, which allows adjustment after hanging, without the need to provide a full width trapeze steel support member under the duct. Most trapezes are made from strut which weighs 1.7 pounds per foot. Consider that a hanger bracket of the current disclosure weighs only 0.4 pounds each and what would be required to hang a 6 foot wide duct using a 7 foot long trapeze, at 11.9 pounds each. A typical installer could only carry approximately 4 of these trapeze struts at a time. Contrast this with the hanger bracket described herein, in two brackets would weigh 0.8 pounds per hanger location and the installer could carry a box of 50 brackets for 25 hanger locations. This provides a meaningful labor and material savings to the installer.

Another advantage conveyed with the bracket of the current disclosure is that the bracket provides ready connection to most universal strut systems. This provides versatility and eliminates the need to purchase and stock multiple hangers and brackets. Using one type of bracket keeps inventory requirements low and standardizes installation methods, thereby reducing mistakes during installation.

As described herein, the bracket provides a way to isolate the bracket from the duct to decrease thermal transmission. In low temperature duct systems, sweating of directly connected hangers or trapezes can cause damage to the duct insulation and other material or equipment under the duct. Providing this thermal separation improves the quality of the installation and provides extra protection to the installer, who is typically responsible for damages due to sweating ducts.

Further, the bracket can be incorporated into a duct reinforcement system while still providing hanger rod attachment. The hanger bracket provides connections for multiple types of pressure reinforcement requirements as defined by SMACNA. Typically the manufacturer of the duct installs all pressure reinforcements required by SMACNA, in the fabrication shop, while the installer provides a separate steel supporting member at the installation site to hang the duct. The bracket of the present disclosure eliminates the need to provide a separate steel support, which reduces material cost and provides labor savings for the installer.

The bracket also provides vibration and seismic connections both to the duct itself and to the hanger system. This is of value particularly in areas where seismic or vibration restraints are required. The installer typically must provide a separate system to connect to the duct or hanger using previous approaches. Incorporating this into one system provides a labor and material savings.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A hanger bracket, comprising:
an extended plate portion configured to support a bottom surface of a duct, the extended plate portion having one or more extended plate holes configured to accommodate coupling of the hanger bracket to the bottom surface of the duct;
a vertical back plate portion attached to the extended plate portion and configured to couple the hanger bracket to a side surface of the duct, the vertical back plate portion having one or more vertical back plate holes configured to accommodate coupling of the hanger bracket to the side surface of the duct;
a top plate portion attached to the vertical back plate portion and in parallel arrangement with the extended plate portion and having one or more top plate holes configured to accommodate a hanger element passed therethrough at a side of the duct above the bottom surface of the duct in an offset hanger attachment; and
at least one angled gusset portion attached to a back side of the vertical back plate portion and an underside of the top plate portion that provides structural support to the top plate portion, with each angled gusset portion of the at least one angled gusset portion having a bottom region coupled to a respective bottom corner region of the back side of the vertical back plate portion, a top region coupled to the underside of the top plate portion at a respective side region of the top plate portion, a front surface coupled to a respective side of the back side of the vertical back plate portion, and an angled back surface formed between the bottom region and the top region where a first dimension of the bottom region of the angled gusset portion is less than a second dimension of the top region of the angled gusset portion.

2. The bracket of claim 1, wherein the vertical back plate portion is coupled to a first end of the extended plate portion.

3. The bracket of claim 1, wherein the vertical back plate portion is coupled to the extended plate portion at an approximately 90 degree angle.

4. The bracket of claim 1, further comprising first and second angled gusset portions attached to a back side of the vertical back plate portion and an underside of the top plate portion that provide structural support to the top plate portion, with each angled gusset portion of the first and second angled gusset portions having a bottom region coupled to a respective bottom corner region of the back side of the vertical back plate portion, a top region coupled to the underside of the top plate portion at a respective side region of the top plate portion, a front surface coupled to a respective side of the back side of the vertical back plate portion, and an angled back surface formed between the bottom region and the top region where a first dimension of the bottom region of the angled gusset portion is less than a second dimension of the top region of the angled gusset portion.

5. The bracket of claim 4,
wherein each of the top regions of the first and second gusset portions has a dimension that approximates the dimension of the respective side region of the top plate portion to which it is coupled.

6. The bracket of claim 5, wherein the dimension of the top region of the first gusset portion approximates the dimension of the top region of the second gusset portion.

7. The bracket of claim 4, wherein the first and second angled gusset portions are in a perpendicular arrangement with respect to the back side of the vertical back plate portion and are parallel to each other, and wherein the top plate portion is in a parallel arrangement with the extended plate portion.

8. The bracket of claim 1, wherein the top plate portion has a thickness dimension that is greater than thickness dimensions of the extended plate, vertical back plate, and first and second angled gusset portions of the hanger bracket.

9. The bracket of claim 8, wherein the top plate portion has a thickness dimension approximately double that of either of the first and second angled gusset portions.

10. The bracket of claim 1, further comprising:
a stabilizing plate coupled to the top plate portion and angled with respect to the top plate portion and having one or more stabilizing plate holes configured to accommodate a stabilizing hanger element passed therethrough at a side of the duct.

11. A duct hanger bracket assembly, comprising:
a duct;
first and second hanger elements; and
one or more hanger brackets, first and second hanger brackets of the one or more hanger brackets each having:
an extended plate portion configured to support a bottom surface of the duct, the extended plate portion having one or more extended plate holes configured to accommodate coupling of the hanger bracket to the bottom surface of the duct;
a vertical back plate portion attached to the extended plate portion and configured to couple the hanger bracket to a side surface of the duct, the vertical back plate portion having one or more vertical back plate holes configured to accommodate coupling of the hanger bracket to the side surface of the duct;
a top plate portion attached to the vertical back plate portion and in parallel arrangement with the extended plate portion and having one or more top plate holes configured to accommodate a hanger element of the first and second hanger elements passed therethrough at a side of the duct above the bottom surface of the duct in an offset hanger attachment; and
first and second angled gusset portions attached to a back side of the vertical back plate portion and an underside of the top plate portion that provide structural support to the top plate portion, with each angled gusset portion of the first and second angled gusset portions having a bottom region coupled to a respective bottom corner region of the back side of the vertical back plate portion, a top region coupled to the underside of the top plate portion at a respective side region of the top plate portion, a front surface coupled to a respective side of the back side of the vertical back plate portion, and an angled back surface formed between the bottom region and the top region where a first dimension of the bottom region of the angled gusset portion is less than a second dimension of the top region of the angled gusset portion.

12. The assembly of claim 11,
wherein a first extended plate hole of the one or more extended plate holes of the extended plate portion is configured to couple the extended plate portion to the bottom surface of the duct responsive to a fastening element inserted through the first extended plate hole of the extended plate portion.

13. The assembly of claim 12, wherein the extended plate portion is coupled to the bottom surface of the duct responsive to the fastening element inserted through the first extended plate hole and through a corresponding hole in a lower surface of a support channel configured to support the duct.

14. The assembly of claim 11, wherein first and second extended plate holes of the one or more extended plate holes of the extended plate portion are configured to couple the extended plate portion to the bottom surface of the duct responsive to first and second fastening elements inserted through the first and second extended plate holes and through corresponding first and second holes in the bottom surface of the duct.

15. The assembly of claim 14, wherein the extended plate portion is directly coupled to the bottom surface of the duct via an insulation tape interposed between a top surface of the extended plate portion and the bottom surface of the duct.

16. The assembly of claim 11, wherein the vertical back plate portion is coupled to a first end of the extended plate portion.

17. The assembly of claim 11, wherein the vertical back plate portion is coupled to the extended plate portion at an approximately 90 degree angle.

18. The assembly of claim 12, wherein a first vertical back plate hole of the vertical back plate portion is configured to couple the vertical back plate portion to the side surface of the duct responsive to a fastening element inserted through the first vertical back plate hole and a corresponding hole in the side surface of the duct.

19. The assembly of claim 18, wherein the vertical back plate portion is directly coupled to the side surface of the duct via an insulation tape interposed between a front surface of the vertical back plate portion and the side surface of the duct.

20. The assembly of claim 11, wherein a second vertical back plate hole of the vertical back plate portion is configured to couple the vertical back plate portion to a support channel coupled to the bottom surface of the duct responsive to a fastening element inserted through the second vertical back plate hole and a corresponding hole in a side surface of a bracket spacer.

21. The assembly of claim 11, wherein a first top plate hole is configured to accommodate an all-thread hanger rod passed therethrough.

22. The assembly of claim 21, wherein a second top plate hole is configured to accommodate a support member of a duct reinforcement element.

23. The assembly of claim 22, wherein the support member is an all-thread rod passed through the second top plate hole and in parallel arrangement with a side of the duct.

24. The assembly of claim 11, wherein the top plate portion has a thickness dimension that is greater than thickness dimensions of the extended plate, vertical back plate, and first and second angled gusset portions of the hanger bracket.

25. The assembly of claim 11, wherein the top plate portion is formed of first and second layers of the first and second angled gusset portions.

26. The assembly of claim 25, wherein the top plate portion has a thickness dimension approximately double that of either of the first and second angled gusset portions.

27. The assembly of claim 11, wherein each of the top regions of the first and second gusset portions has a dimension that approximates the dimension of the respective side region of the top plate portion to which it is coupled.

28. The assembly of claim 27, wherein the dimension of the top region of the first gusset portion approximates the dimension of the top region of the second gusset portion.

29. The assembly of claim 11, wherein the first and second angled gusset portions are in a perpendicular arrangement with respect to the back side of the vertical back plate portion and are parallel to each other and
wherein the top plate portion is in a parallel arrangement with the extended plate portion.

30. The assembly of claim 11, further comprising:
a stabilizing plate coupled to the top plate portion and angled with respect to the top plate portion and having one or more stabilizing plate holes configured to accommodate a stabilizing hanger element passed therethrough at a side of the duct.

31. A duct hanger bracket assembly, comprising:
a duct;
first and second hanger elements;
first and second duct reinforcement elements; and
a plurality of hanger brackets, comprising:
first and second hanger brackets of the one or more hanger brackets each having:
an extended plate portion configured to support a bottom surface of the duct, the extended plate portion having one or more extended plate holes configured to accommodate coupling of the hanger bracket to the bottom surface of the duct;
a vertical back plate portion attached to the extended plate portion and configured to couple the hanger bracket to a side surface of the duct, the vertical back plate portion having one or more vertical back plate holes configured to accommodate coupling of the hanger bracket to the side surface of the duct;
a top plate portion attached to the vertical back plate portion and in parallel arrangement with the extended plate portion and having one or more top plate holes configured to accommodate a respective duct reinforcement element of the first and second duct reinforcement elements passed therethrough at a side of the duct above the bottom surface of the duct in an offset hanger attachment; and
first and second angled gusset portions attached to a back side of the vertical back plate portion and an underside of the top plate portion that provide structural support to the top plate portion, with each angled gusset portion of the first and second angled gusset portions having a bottom region coupled to a respective bottom corner region of the back side of the vertical back plate portion, a top region coupled to the underside of the top plate portion at a respective side region of the top plate portion, a front surface coupled to a respective side of the back side of the vertical back plate portion, and an angled back surface formed between the bottom region and the top region where a first dimension of the bottom region of the angled gusset portion is less than a second dimension of the top region of the angled gusset portion;
third and fourth hanger brackets of the one or more hanger brackets each having:
an extended plate portion configured to support a top surface of the duct, the extended plate portion having one or more extended plate holes configured to accommodate coupling of the hanger bracket to the top surface of the duct;
a vertical back plate portion attached to the extended plate portion and configured to couple the hanger bracket to a side surface of the duct, the vertical back plate portion having one or more vertical back plate holes configured to accommodate coupling of the hanger bracket to the side surface of the duct;
a top plate portion attached to the vertical back plate portion and in parallel arrangement with the extended plate portion and having two or more top plate holes, with a first top plate hole configured to accommodate a respective duct reinforcement element of the first and second duct reinforcement elements passed therethrough at a side of the duct below a top surface of the duct and with a second top plate hole configured to accommodate a respective hanger element of the first and second hanger elements passed therethrough at a side of the duct below the top surface of the duct in an offset hanger attachment;
first and second angled gusset portions attached to a back side of the vertical back plate portion and an underside of the top plate portion that provide structural support to the top plate portion, with each angled gusset portion of the first and second angled gusset portions having a bottom region coupled to a respective bottom corner region of the back side of the vertical back plate portion, a top region coupled to the underside of the top plate portion at a respective side region of the top plate portion, a front surface coupled to a respective side of the back side of the vertical back plate portion, and an angled back surface formed between the bottom region and the top region where a first dimension of the bottom region of the angled gusset portion is less than a second dimension of the top region of the angled gusset portion.

\* \* \* \* \*